Figure 3:
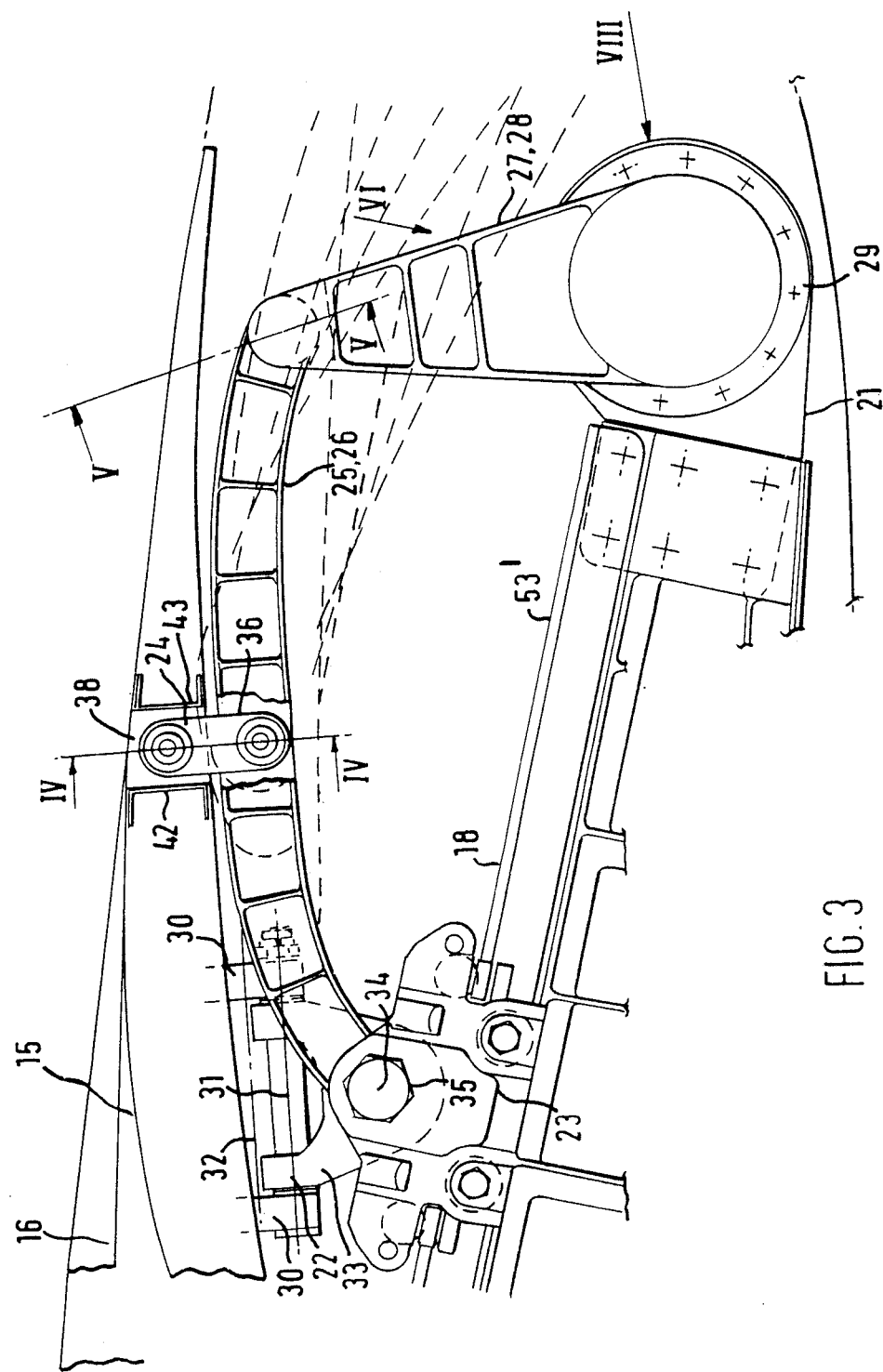

United States Patent [19]

Williams

[11] Patent Number: 4,840,331
[45] Date of Patent: Jun. 20, 1989

[54] TRAILING EDGE FLAPS FOR AIRCRAFT WINGS

[75] Inventor: George H. Williams, Almondsbury, United Kingdom

[73] Assignee: British Aerospace PLC, London, United Kingdom

[21] Appl. No.: 230,018

[22] Filed: Aug. 9, 1988

[30] Foreign Application Priority Data

Aug. 11, 1987 [GB] United Kingdom ............... 8718977

[51] Int. Cl.[4] .............................................. B64C 3/50
[52] U.S. Cl. ................................... 244/212; 244/216
[58] Field of Search ............... 244/212, 213, 215, 216, 244/217, 218, 211

[56] References Cited

U.S. PATENT DOCUMENTS 4,381,093 4/1983 Rudolph ............................. 244/215
4,542,869 9/1985 Brine ................................... 244/216

Primary Examiner—Joseph F. Peters, Jr.
Assistant Examiner—Anne E. Sartelle
Attorney, Agent, or Firm—Dennis P. Clarke

[57] ABSTRACT

A trailing edge flap assembly for an aircraft wing includes at its rearward end upper and lower surfaces terminating in a trailing edge portion. The assembly has a flap (15) is located in a stowed position during normal flight. A mounting beam (18) is located to the lower surface (12) of the wing, extending rearwardly thereof and below the flap (15). A carriage (23) is in rolling engagement with longitudinal guideways (53) on the mounting beam (18). To actuate the flap (15), at or about the rearward extremity of the mounting beam (18), there is provided an actuator mounting bracket (21), a rotary actuator (52), and lever arms (27, 28) associated with the actuator about a common substantially transverse axis of rotation. The lever arms (27, 28) extend upwardly and terminate adjacent the undersurface of the flap (15), in a pivotal attachment (22) forwardly extending actuator links (25, 26) pivotally interconnecting the lever arms (27, 28) and the carriage (23). The flap (15) is supported by means of first link (33) interconnecting the carriage (23) to a forward portion of the flap (15), and a second link (36) interconnecting the actuator links (25, 26) to a more rearward portion of the flap (15). Location of a powered actuator (52) at the rear extremity of the mounting beam (18) in direct engagement with an actuating lever (27, 28) in close driving engagement with the flap (15) is both efficient and reduces power requirements.

4 Claims, 4 Drawing Sheets

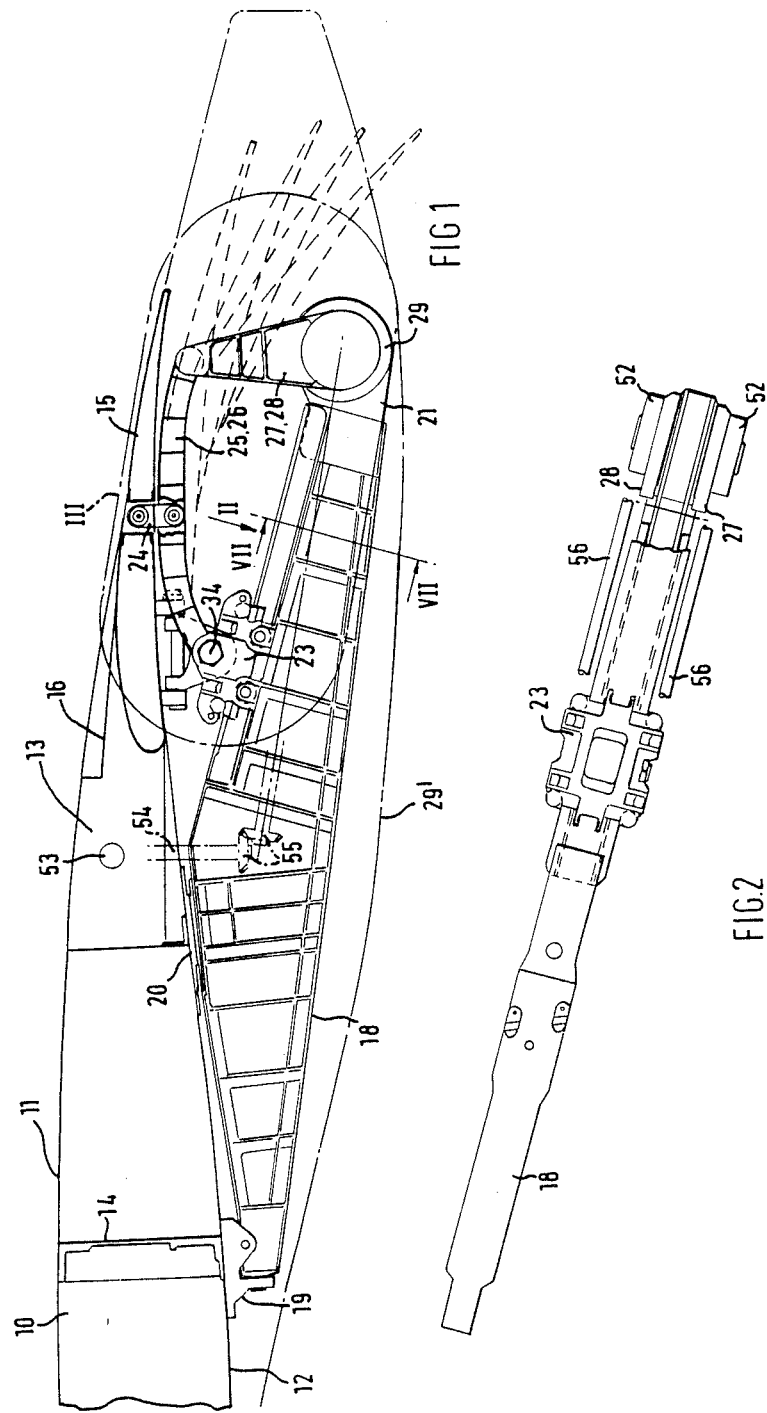

TRAILING EDGE FLAPS FOR AIRCRAFT WINGS

This invention relates to trailing edge flap arrangements for aircraft wings.

According to the present invention there is provided a trailing edge flap assembly for an aircraft wing, said wing including at its rearward end upper and lower surfaces terminating in a trailing edge portion, said trailing edge flap assembly comprising a flap member located in a first stowed position during normal flight within said trailing edge portion, a mounting beam located to said wing lower surface and extending rearwardly thereof and below said flap member, substantially longitudinal guideway means on said mounting beam, carriage means in rolling engagement with said guideway means and flap actuation means located at or about the rearward extremity of said mounting beam, said flap actuation means comprising actuator mounting means, a rotary actuator and at least one lever arm associated with said rotary actuator about a common substantially transverse axis of rotation, said lever arm extending upwardly and terminating adjacent the undersurface of said flap member in a pivotal attachment to at least one forwardly extending actuator link pivotally interconnecting said lever arm and said carriage, said flap member supported upon said flap assembly by means of first link means interconnecting said carriage means to a forward portion of said flap member and second link means interconnecting said actuator link means to a more rearward portion of said flap member.

By this compact mechanical arrangement utilising a rotary actuator located at or about the rearward extremity of the mounting beam, angular displacement of the lever arm induces rearward translation of the flap and simultaneous rearward movement of the carriage along the trackway. The relative motion of the component parts of the assembly combines to effect the desired translation and rotation of the flap from the first stowed position within the trailing edge to a second fully deflected flap position in the landing mode or intermediate settings as required.

Preferably, the lever arm or arms form an integral part of the actuator. Preferably also, for fail-safe reasons, the actuator, lever arms, actuator link and rear flap support links are duplicated.

Figure 4:
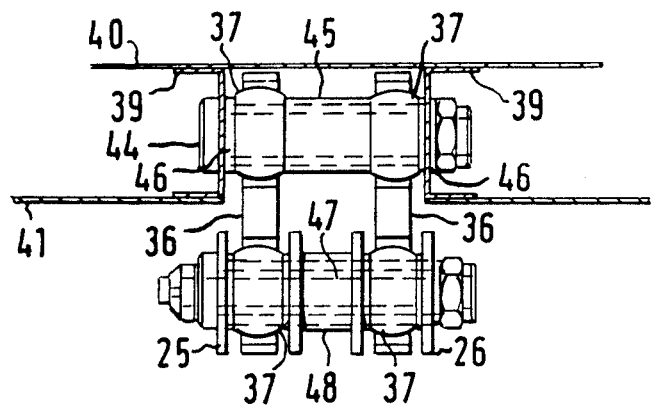
Figure 5:
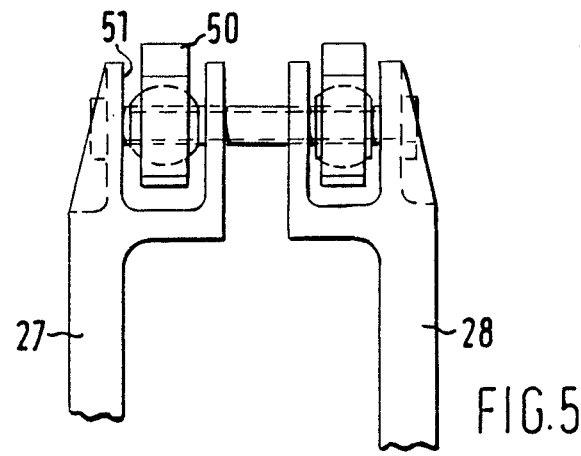
Figure 6:
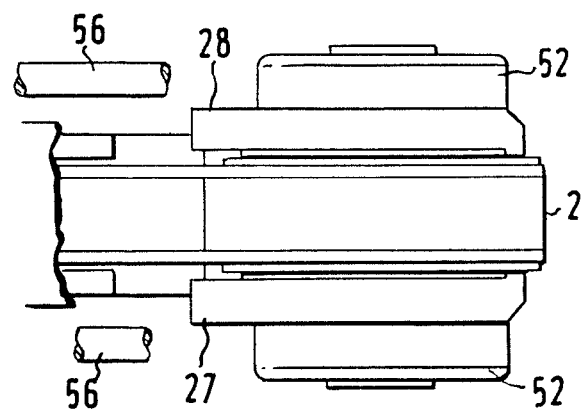
Figure 7:
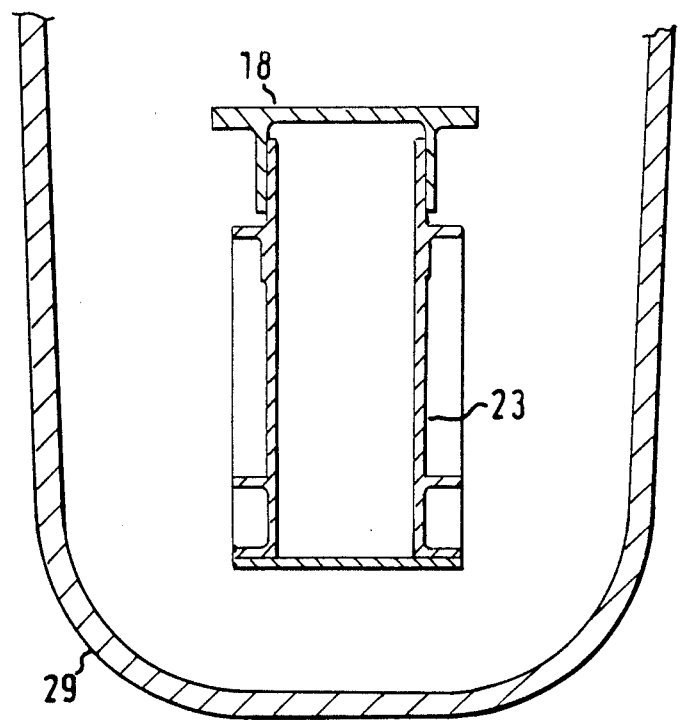
Figure 8:
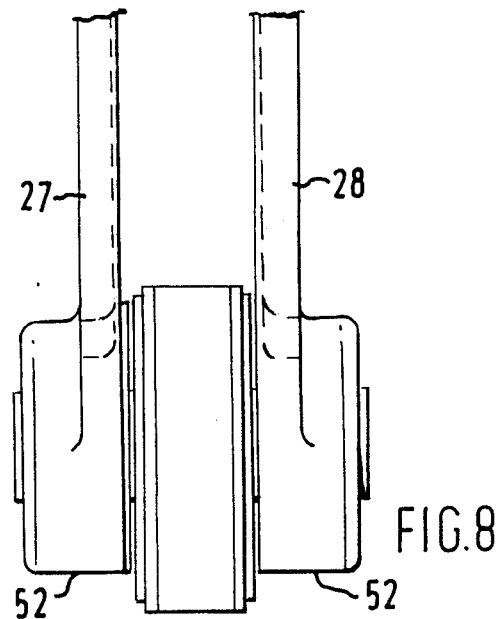

One embodiment of the invention will now be described, by way of example only, with reference to the accompanying drawings in which:

FIG. 1 is a sectional view of an aft portion of an aircraft wing incorporating a trailing edge flap assembly in accordance with the present invention, FIG. 2 is a plan view on the flap support beam assembly taken in direction of arrow II in FIG. 1, FIG. 3 is a local detail, to a larger scale, of the flap attachment and actuation arrangement marked in chain lines as 'III' in FIG. 1, FIG. 4 is a part-section, to a larger scale, taken along a plane indicated by lines IV—IV in FIG. 3 illustrating the aft flap attachment, FIG. 5 is a section, to a larger scale, illustrating the actuating lever and beam interconnection, taken along a plane indicated by lines V—V in FIG. 3, FIG. 6 is a localised plan view on the flap support beam in the vicinity of the actuator assembly, in the direction of arrow VI in FIG. 3, FIG. 7 is a section taken along a plane indicated by lines VII—VII in FIG. 1, and FIG. 8 is an end view on the actuator assembly taken along a plane indicated by lines VIII—VIII in FIG. 3.

Referring to the drawings, and FIGS. 1–3 inclusive in particular, there is illustrated an aft portion of an aircraft wing 10 having an upper surface 11, a lower surface 12, and a trailing edge portion 13 extending rearwardly from a spanwise spar 14. A single trailing edge flap member 15 and a spoiler 16 are shown in stowed attitude within the trailing edge portion 13.

Extending rearwardly from the underside of the wing 10 is a mounting beam 18 having a forward structural attachment 19 at the location of the spar 14 and a rearward structural attachment 20 to the trailing edge portion 13. The rearward extremity of the mounting beam 18 incorporates a flap support and an actuator mounting bracket 21.

As shown more clearly in FIG. 3, the flap 15 is supported with respect to the wing structure by means of a forward attachment assembly 22 pivotally located to a carriage 23 in rolling engagement with the mounting beam 18, and a rearward attachment assembly 24 depending from the flap and pivotally located at its lower end to a pair of parallel actuator links 25 and 26 pivotally located at their forward ends to the carriage 23 and at their rearward ends to twin lever arms 27 and 28 extending upwardly from a rotary actuator assembly 29 located in the actuator mounting bracket 21. The whole of the flap support and actuating assembly is contained within a fairing arrangement 29' shown in chain-dot line but not described in detail here.

Described in more detail, the forward attachment assembly 22 comprises two spaced apart lugs 30 concentrically located about a longitudinal pivot axis 31, and a bolt 32 spanning the lugs and engaging a forked side link 33. This side link 33 is pivotally located about a transverse pivot axis 34 incorporating self-aligning bearing means not shown, via a bolt attachment 35 to the carriage 23.

The rearward attachment assembly 24, illustrated in more detail in FIG. 4, principally comprises two side-by-side links 36, spaced apart in alignment with the actuator links 25 and 26. Each link includes self-aligning bearings 37 at their respective upper and lower pivotal attachments. The upper attachments engage suitable structural members 38 (FIG. 3) within the flap, comprising fore and aft channel members 39 located between the flap upper and lower skin surfaces 40 and 41 respectively. These channel members extend between spanwise channel members 42 and 43 which may constitute the basic flap structure. The upper attachment constitutes a bolt 44 forming a transverse pivot axis, transverse location and separation of the links being maintained by a distance piece 43 and distance washers 46. The flap lower skin 41 is locally removed sufficiently to allow protrusion of the links 36. The lower link attachment to the actuator links 25 and 26 comprises a transverse pivotal attachment bolt 47, separation of the respective links 25 and 26 being maintained by a distance piece 48.

It will be noted that the actuating links 25 and 26 are slotted in a vertical plane so that the links and their respective lower self-aligning bearings locate between side walls formed by the slot. Although not shown in detail here, the lower bearing housing in one of the links 36 is arranged to be slotted vertically so that the bearing is able to move vertically within the slot. This provides an element of lost motion for reasons to be described. The self-aligning nature of the flap attachments provides compensation for limited differential movement between the flap and adjacent wing structure.

As illustrated in FIG. 5, the rearward extremity of the actuator links 25 and 26 also include self-aligning bearings 50, the link end lying between a fork end termination 51 of the lever arms 27 and 28. In this embodiment, the lever arms 27 and 28 form an integral part, as illustrated in FIG. 8, of the outer casing of twin plug-in rotary actuators 52, in engagement, by means not shown, with the actuator mounting bracket 21. In the preferred arrangement of the present embodiment the rotary actuators are driven by a power source such as an hydraulic motor (not shown) located within the wing trailing edge structure and driving a spanwise system of torque transmission shafting 53, as illustrated in FIG. 1. Secondary shafting at each flap actuating station interconnects with each actuator.

By way of example, this is illustrated in FIG. 1 and 2 which shows vertical torque shaft 54 connecting via a bevel gear arrangement 55 with a pair of longitudinal torque shafts 56 engaging the rotary actuators 52.

Alternative arrangements may be employed without departing from the scope of this invention. For example, the actuator mounting bracket 21 may be adapted to incorporate, with suitable bearing means, integral lever arms with which separate actuators may be engaged. Similarly, self-powered rotary actuators may be utilised, thus removing the need for torque shafting as in the present arrangement.

The advantages and operation of the arrangement of the present invention will now be described. Prior art arrangements for flap actuation are well-known which utilise rotary actuators for driving the operating linkages and whereby a flap is capable of moving over a wide range of movement from its stowed position, in the cruise mode, to a fully deployed high-lift landing mode setting, and to selected intermediate positions. It is also known to utilize a support beam as in the present embodiment, referenced 18, with a lever arm for supporting the flap which is pivotally located at the rearward extremity of the beam. This lever arm reacts to flight loads and provides an actuating input to the flap. The shortcoming of these earlier arrangements appears to reside in the fact that the actuator lies to some extent remote from the point of input to effect flap movement, and in certain circumstances this necessitates long or complex linkage arrangements which can result in undesirable back-lash in the system.

This in turn may result in excessive power requirements. It has been found, and is considered to be a novel arrangement, that a powered actuator is located at or about the rearward extremity of the mounting beam and directly engages an actuating lever in close driving engagement with the flap; such an arrangement is beneficial in terms of working efficiency and, more particularly, a significantly reduced power requirement, calculated as a reduction of 4.5 times in torque loading requirements.

In operation, to deploy the flap from its stowed position to a desired setting, the rotary actuator 52 via its lever arm 27 or 28 causes the actutor links 25 or 26 to draw the flap from its stowed position via the interconnection with forward and rearward attachment assemblies. The relationship between flap rearward translation and angular rotation is a function of the angular displacement of the lever arm 27 and the associated movement of the carriage 23 along the inclined upper region 53' of the mounting beam 18. Whilst ideally the distance between rear flap attachment and the actuation input point should be minimal, practical considerations such as the strength of the flap towards its rearward extremity must be the determining factor.

Finally, a further benefit of the present embodiment is the fail-safe nature of the installation residing in the use of duplicated actuators, lever arms and other linkages associated with the flap support and arrangement. This ensures that in the event of a single failure of either of the lever arms 27 or 28, for example or other of the associated elements, the duplication will ensure integrity of operation. Although the duplicated linkage and actuation arrangements operate simultaneously, lost motion provision in one side ensures dormancy until such time as a failure occurs.

I claim:

1. A trailing edge flap assembly for an aircraft wing, said wing including at its rearward end upper and lower surfaces terminating in a trailing edge portion, said trailing edge flap assembly comprising a flap member located in a stowed position during normal flight within said trailing edge portion, a mounting beam located to said wing lower surface and extending rearwardly thereof and below said flap member, substantially longitudinal guideway means on said mounting beam, carriage means in rolling engagement with said guideway means, and flap actuation means located at or about the rearward extremity of said mounting beam the improvement consisting in that said flap actuation means comprises actuator mounting means, a rotary actuator and at least one lever arm associated with said rotary actuator about a common substantially transverse axis of rotation, said at least one lever arm extending upwardly and terminating adjacent the undersurface of said flap member in a pivotal attachment to at least one forwardly extending actuator link pivotally interconnecting said at least one lever arm and said carriage means, said flap member being supported upon said flap assembly by means of first link means interconnecting said carriage means to a forward portion of said flap member and second link means interconnecting said at least one actuator link to a more rearward portion of said flap member.

2. An assembly as claimed in claim 1, wherein the said at least one lever arm form an integral part of the actuator.

3. An assembly as claimed in claim 1, wherein the actuator, lever arms, actuator link and said second link means are all duplicated.

4. An assembly as claimed in claim 1 wherein the said second link mean interconnects said at least one actuator link by a lost motion connection.

* * * * *